UNITED STATES PATENT OFFICE.

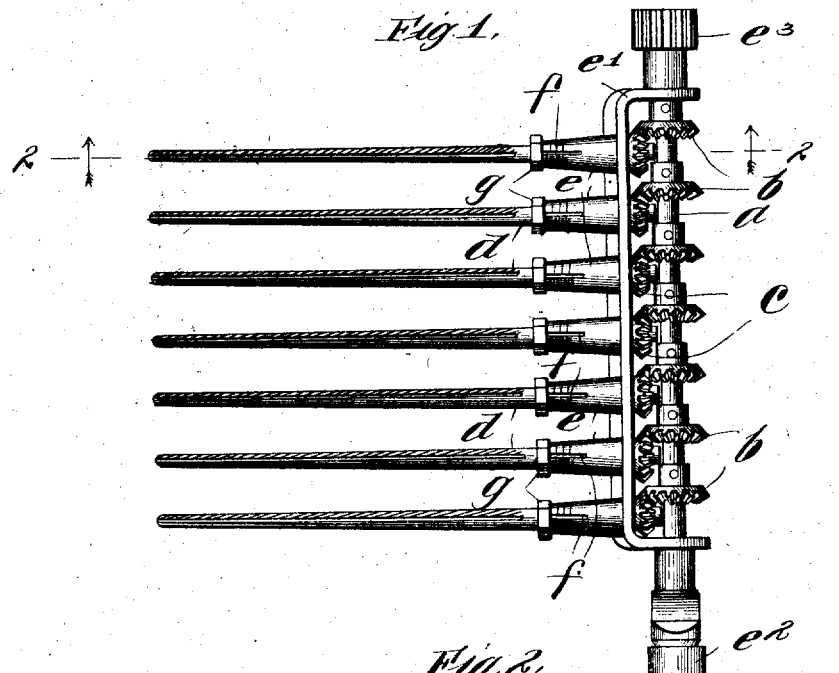
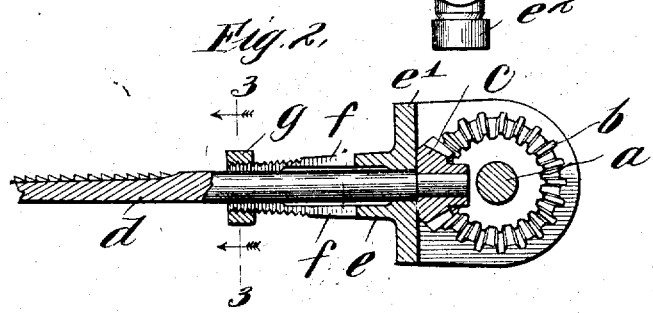
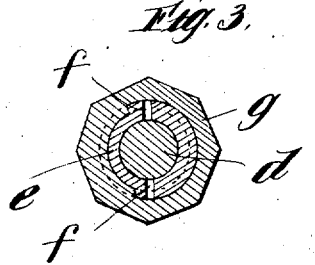

JOHN F. APPLEBY, OF CHICAGO, ILLINOIS.

COTTON-PICKING MACHINE.

972,795.

Specification of Letters Patent. Patented Oct. 18, 1910.

Application filed January 21, 1907. Serial No. 353,216.

*To all whom it may concern:*

Be it known that I, JOHN F. APPLEBY, citizen of the United States, residing at Chicago, in the county of Cook and State of Illinois, have invented a certain new and useful Improvement in Cotton-Picking Machines, of which the following is a full, clear, concise, and exact description, reference being had to the accompanying drawings, forming a part of this specification.

My invention relates to cotton picking machines, and has for its object an improvement in the construction of the picker columns thereof, whereby the picking spindles may be caused to maintain definite axes of rotation with respect to the picker columns, so that definite relations will always be maintained between the picking spindles and the internal mechanism of the cotton picking machines, and notably the stripping mechanism with which the picking spindles coöperate.

By means of my invention I have overcome a difficulty in the operation of cotton picking machines which has presented itself to me in the field, for in the course of time, the bearings carried by the picker columns have become worn to such an extent as to permit the spindles to wabble at their bearings, thereby permitting the points of the spindles to become deflected too far from the proper axes of rotation and planes of movement of the spindles; the points of the spindles having frequently come into improper engagement with the strippers, occasioning destruction or impairment of working parts of the machines. I provide means for adjusting the bearings of the spindles, so that their axes of rotation may be properly positioned and their planes of movement suitably maintained. This adjustment preferably resides in mechanism for contracting the bearings to compensate for their wear.

The device of my invention is of particular service in connection with that class of cotton picking machines disclosed in my United States Patent No. 798,651, dated Sept. 5, '05.

My invention will fully appear by reference to the accompanying drawing and will be pointed out in the appended claim.

In the drawing—Figure 1 is a view in plan of a cotton picker column and the fingers associated therewith. Fig. 2 is a sectional view on line 2–2 of Fig. 1. Fig. 3 is a view in cross-section on line 3–3 of Fig. 2.

Like parts are indicated by similar characters of reference throughout the different figures.

Any suitable form of mechanism may be employed for operating the spindles. In the embodiment of the invention shown, I have illustrated a driving shaft *a*, which carries a plurality of gears *b*. Each gear *b* is in mesh with a gear *c* that is fixed upon the base end of each picking spindle *d*. The base portion of each picking spindle is made smooth and is disposed within a journal bearing *e*, the journal bearings for the picking spindles being in the form of nipples, desirably integrally formed with the picker column $c^1$, that is provided with bearings at its ends for the operating shaft *a*, and which is provided with suitable cam mechanism $e^2$ for determining the angular positions of the cotton picking spindles and with the pinion $c^3$ upon the end of the operating shaft *a*, to effect the rotation of said shaft and the bodily travel of the picker column. In order that these bearings may be contracted and the adjustment of the axes of rotation of the picking spindles and the planes of movement of the picking spindles may be adjustably maintained, I slot each nipple *e* longitudinally thereof and preferably at two diametrically opposite sides of each nipple at *f*, *f*.

In the embodiment of the invention shown, the picking spindles are adapted to travel bodily in vertical planes, and on this account, the slots *f* are preferably disposed in vertical planes. In other words, the nipples are provided with slots that are disposed in planes parallel to the planes of bodily movement of the picking spindles, whereby the bearings are contractible in planes substantially at right angles to the planes of bodily movement of the picking spindles. In the machine of my aforesaid patent, the spindles are set forth as having this bodily movement in vertical planes, and I do not, therefore, think it necessary to furnish any further explanation of this characteristic herein set forth.

The advantage of disposing the slots in the bearings in planes parallel to the planes of movement of the picking spindles, is apparent when it is understood that the tendency to wear at the bearings is greatest in planes at right angles to the planes of movement of the picking spindles, as will appear by an inspection of the drawing.

The bearings *f* are tapered toward the points of the spindles and are provided with threads where tapered, and rings *g* correspondingly threaded and tapered, are screwed upon the bearings and are adapted to contract the same when moved toward the bases of the bearings.

It will be seen that I have provided a cotton picking machine including a cotton picker column provided with a plurality of bearings, cotton picking spindles in said bearings, mechanism for effecting the rotation of said spindles, and adjustable means for maintaining the axes of rotation of said spindles with respect to the picker column substantially fixed.

I do not wish to be limited to the precise mechanism disclosed for effecting contraction of the bearings and adjustment of the axes of the picking spindles herein set forth.

Having thus described my invention, I claim as new and desire to secure by Letters-Patent:—

A cotton picking machine including a driving shaft *a* carrying a plurality of gears *b*, a plurality of gears *c* in mesh with the gears *b*, a plurality of picking spindles *d* upon the inner ends of which the gears *c* are mounted, a supporting element $e^1$ carrying bearings *e* through which the bases of the picking spindles pass, the opposite ends of the picking spindles being free, said bearings having slots *f* extending through to the bores thereof and occupying planes that are transverse to the driving shaft, and adjusting devices for contracting the bearings to suit their bores to the diameters of the portions of the picking spindles within said bores, whereby the picking spindles may be caused to maintain definite axes of rotation.

In witness whereof, I hereunto subscribe my name this 17th day of January A. D., 1907.

JOHN F. APPLEBY.

Witnesses:
MYHR SMITH,
B. M. WOODS.